United States Patent [19]
Hastings et al.

[11] Patent Number: 5,809,765
[45] Date of Patent: Sep. 22, 1998

[54] COUNTERROTATION MULCHING MOWER AND BLADE ASSEMBLY

[75] Inventors: Dawson W. Hastings; Charlie C. Johnson, both of Selma, Ala.

[73] Assignee: Allied Products Corporation, Chicago, Ill.

[21] Appl. No.: 818,882

[22] Filed: Mar. 17, 1997

[51] Int. Cl.$^6$ .................................................. A01D 34/66
[52] U.S. Cl. .......................... 56/295; 56/255; 56/DIG. 17
[58] Field of Search .................. 56/17.5, 255, 295, 56/DIG. 17, DIG. 20, 13.5, 16.9

[56] References Cited

U.S. PATENT DOCUMENTS

| | | | |
|---|---|---|---|
| 269,264 | 12/1882 | Cloyd | 74/417 |
| 2,171,750 | 9/1939 | Hooe | 56/255 |
| 2,443,027 | 6/1948 | Dishmaker . | |
| 2,486,799 | 11/1949 | Oppenheim | 74/417 |
| 2,614,440 | 10/1952 | Richey . | |
| 2,701,942 | 2/1955 | Caldwell, Jr. et al. | 56/503 |
| 2,795,914 | 6/1957 | Smith . | |
| 2,891,369 | 6/1959 | Rietz | 56/503 |
| 3,385,043 | 5/1968 | Seymore . | |
| 3,478,620 | 11/1969 | Shimanckas . | |
| 3,503,274 | 3/1970 | Howard . | |
| 3,618,304 | 11/1971 | Hundhausen . | |
| 4,090,346 | 5/1978 | Doi | 56/13.6 |
| 4,196,568 | 4/1980 | Perry | 56/13.8 |
| 4,287,790 | 9/1981 | Fujiwara et al. | 74/665 |
| 4,526,180 | 7/1985 | Scott et al. | 130/27 R |
| 4,573,269 | 3/1986 | Hernandez | 30/240 |
| 4,634,403 | 1/1987 | Peabody et al. | 474/1 |
| 4,696,199 | 9/1987 | Fabbri | 74/417 |
| 4,900,292 | 2/1990 | Berry et al. | 474/84 |
| 4,919,244 | 4/1990 | Bondioli | 192/56 |
| 4,926,623 | 5/1990 | Fiener | 56/60 |
| 5,065,639 | 11/1991 | Flanhardt et al. | 74/417 |
| 5,077,959 | 1/1992 | Wenzel | 56/11.1 |
| 5,127,215 | 7/1992 | Wenzel | 56/11.1 |
| 5,271,212 | 12/1993 | Anderson | 56/295 |
| 5,450,714 | 9/1995 | Lurwig | 56/13.5 |
| 5,669,213 | 9/1997 | Britton | 56/17 |

*Primary Examiner*—Michael J. Carone
*Assistant Examiner*—Arpad Fabian Kovacs
*Attorney, Agent, or Firm*—Lockwood, Alex, Fitzgibbon & Cummings

[57] ABSTRACT

A mulching mower is provided for mowing and mulching turf vegetation in order to reduce the size of the cut vegetation and more evenly distribute the vegetation once thus cut. Counterrotating, coaxial mowing blade and mulching tool assemblies are provided. The mowing blade assembly is driven by a central shaft rotatably mounted through a drive barrel which drives the mulching tool. The mulching tool assembly includes a plurality of blades, typically pivotally mounted, at least one of the mulching blades being in a lower mulching plane, and at least one other of the mulching blades being in an upper mulching plane.

20 Claims, 3 Drawing Sheets

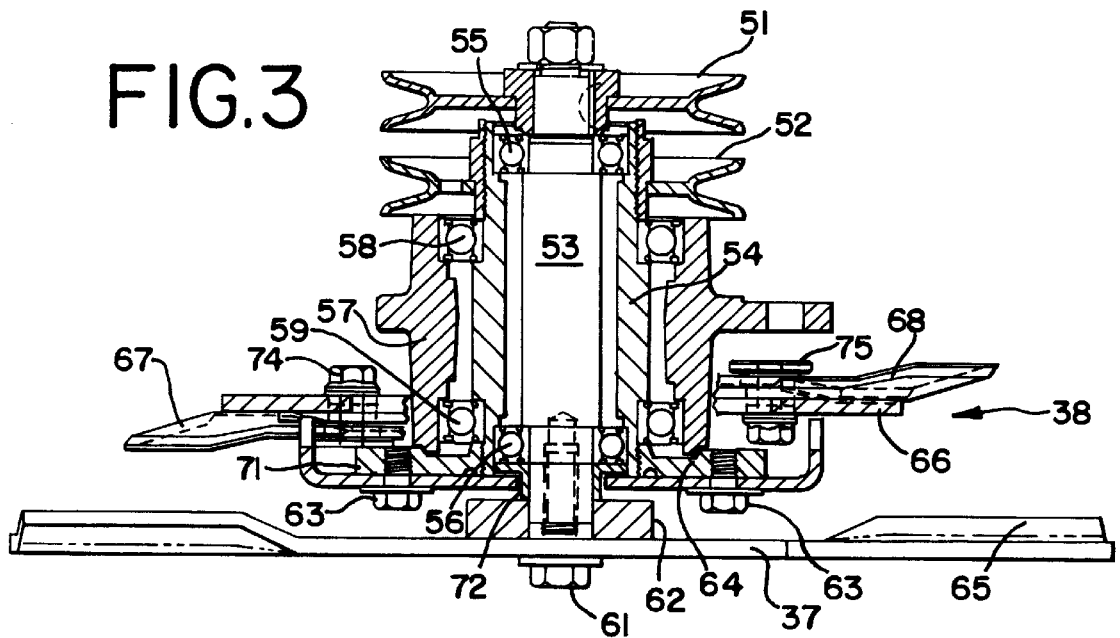
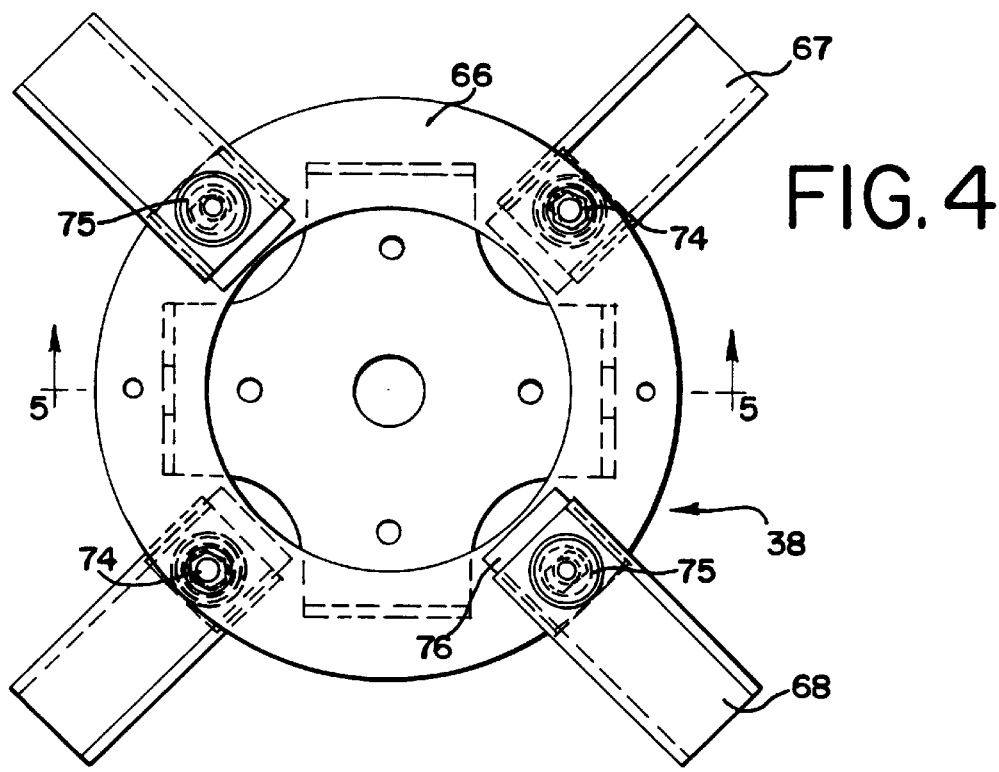
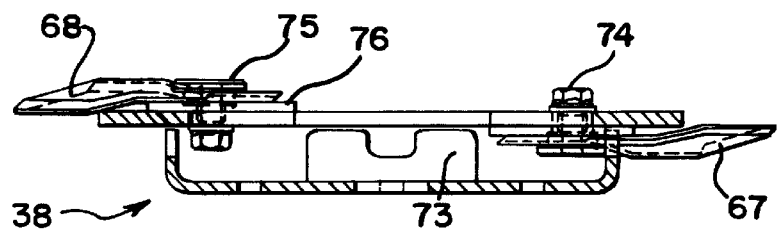

1

COUNTERROTATION MULCHING MOWER AND BLADE ASSEMBLY

BACKGROUND OF THE INVENTION

The present invention generally relates to finishing mowers for cutting and mulching grasses and similar vegetation by the use of double-cutting action effected by counterrotating blade and mulching tool assemblies. More particularly, the invention is a finishing mower which cuts and mulches by a plurality of cutting tools, some of which rotate in a clockwise direction and others in a counterclockwise direction, and that is particularly designed for mowing and mulching grasses and the like without discharging any visible cut material. The invention finds special application in connection with commercial turf mowing equipment, such as that designed for use on golf courses, athletic fields, large lawns, parks and turf farms.

Finishing mowers can vary in size and type, including equipment which is pulled by a pulling vehicle such as a small tractor or garden tractor and is driven by the power take-off (PTO) shaft of the pulling vehicle. Other pull-behind types of finishing mowers have their own sources of power, such as gasoline engines, these types of finishing mowers being used in connection with pulling vehicles such as smaller garden tractors without PTO capabilities, or All Terrain Vehicles. Other finishing mowers are of the self-propelled type, typically having a gasoline-powered engine which drives both the ground-engaging wheels and the cutting units. Multiple-deck finishing mowers (often three-deck mowers) are also available, typically as a PTO-driven, pull-behind unit. These types of devices are intended for providing clean and low cuts so as to impart a finished and neat appearance to growing grasses. They can also be used under somewhat tougher cutting conditions, such as for light and medium grasses.

In many applications, it is important to avoid the formation of windrows or the depositing of clumps of cut grass and other foliage. Thick cut grass deposits are not only unsightly, but deterioration and decomposition of the grass is slowed considerably because the clumped grass reduces the ability of air and moisture to work on the grass clippings so that they will break down into nutrients which are useful for the growing vegetation. Approaches have been taken to provide so-called mulching mowers. Typically, these provide a modified blade design, often combined with a baffle system to hold the clippings within the cutting area in an effort to chop the clippings and deposit them under the moving mower without throwing the clippings to the side or to the rear, for example. These types of approaches have met with reasonable success, but are not particularly suitable for use in situations where the amount of foliage to be cut is anything greater than a short-to-moderate length. Often, proper mulching is accomplished when the amount of grass removed is not greater than about 1 inch and perhaps up to about 2 inches under proper conditions.

There is accordingly a need for a finishing mower that has mulching capabilities and which will allow for thorough cutting and mulching of foliage under various conditions, including grass removal lengths of up to 2½ inches and longer. In this regard, mulching should accomplish chopping of cut grass or fallen leaves, pinestraw and the like into small slivers which are not visible without careful inspection and which deteriorate more rapidly than if left whole. It is desirable to provide a mulching finishing mower that cuts and shreds longer lengths of foliage without discharge and while leaving no visible cut material.

A further problem which can develop with finishing mowers is the buildup of cut foliage under the mower deck. This is of particular concern when cutting under wet crop conditions. It has been observed that, with various mulching devices, cut material will build up on the under surface of the deck until it reaches the blade. Typically, this nullifies mulching action because the blade does not have any free space above it for the desired mulching action to occur. In some instances, the wet crop material can actually build up to such an extent that it wedges between the blade and the under surface of the deck. At times, this can result in interference with blade rotational speed and even result in locking of the blade so as to stop blade rotation. It will be appreciated that these difficulties can lead to substantial damage to mower components as well as substantially impaired performance of the finishing mower.

In connection with rotary cutters, as opposed to turf mowers or finishing mowers, it has been proposed to provide rotary cutters having double counterrotating blades in order to attempt to achieve a double-shredding action by the rotary cutter. Objectives include promoting more rapid decomposition, destruction of insects such as boll weevils, corn bores and the like, while improving evenness of spreading for reducing windrowing of cut vegetation. Such a proposed structure is found in U.S. Pat. No. 3,385,043 to Seymore. An improvement on this approach is found in U.S. Pat. No. 5,450,714 to Lurwig. These approaches utilize gearbox and drive train assemblies and are not particularly well suited for finishing mowers of the type in accordance with the present invention.

SUMMARY OF THE INVENTION

In summary, the present invention is directed to a finishing mower which has substantially enhanced mulching capabilities as discussed. The mower includes a counterrotation arrangement whereby a lower mowing blade and an upper mulching tool rotate in a coaxial manner within a deck assembly. A drive assembly secured to the deck assembly has a driven output shaft in rotatable driving engagement with the lower mowing blade and a driven output tube in rotatable driving engagement with the upper mulching tool, with the output shaft passing through this output tube. Secured thereabove are driven members for independently driving the driven output shaft and the driven output tube, respectively, in opposite directions. The upper mulching tool, which thus counterrotates with respect to the lower mowing blade, has a plurality of blades mounted at multiple levels or heights. In the preferred arrangement which is illustrated, each mulching tool blade is pivotally mounted from a blade carrier which is secured to the rotating driven output tube.

It is a general object of the present invention to provide an improved finishing mower with counterrotating cutter elements.

Another object of this invention is to provide an improved mulching finishing mower with counterrotating cutting components that chop cut grass blades, fallen leaves, pinestraw and the like into small slivers which deteriorate more rapidly than vegetation cut into larger pieces.

Another object of the present invention is to provide an improved mulching finishing mower that incorporates two counterrotating cutter components, one being a multi-bladed and multi-level mulching tool, within each cutting circle of the mower, thereby causing cut material to change directions in order to increase mulching action under wet crop and under dry crop conditions.

Another object of this invention is to provide an improved mulching turf mower which sharply reduces detrimental build-up of cut foliage between the underside of the mower deck and the blade assembly in order to thereby enhance mulching and avoid blade lock-up and attendant potential damage to the mower.

Another object of this invention is to provide a finishing turf mower that accomplishes mulching action in different grasses, whether wet or dry, including the removal of up to and greater than 2½ inches and which achieves cutting and shredding without discharging or leaving behind visible cut material.

Another object of the present invention is to provide a finishing mower that will successfully mulch long turf without the development of clumped foliage for areas such as sod farms, golf courses, private lawns, athletic fields, municipal grassy areas and recreational areas, particularly where high quality cutting of turf grasses is required.

These and other objects, features and advantages of the present invention will be clearly understood through a consideration of the following detailed description.

BRIEF DESCRIPTION OF THE DRAWINGS

The invention will be further elucidated in the following description with reference to the drawings in which:

FIG. 3 is a cross-sectional view through a belt-driven spindle assembly as generally shown in FIG. 2;

FIG. 4 is a top plan view of a preferred embodiment of the mulching tool as shown in FIG. 3;

FIG. 5 is generally cross-sectional view along the line 5—5 of FIG. 4;

DESCRIPTION OF THE REFERRED EMBODIMENTS

Figure 1:
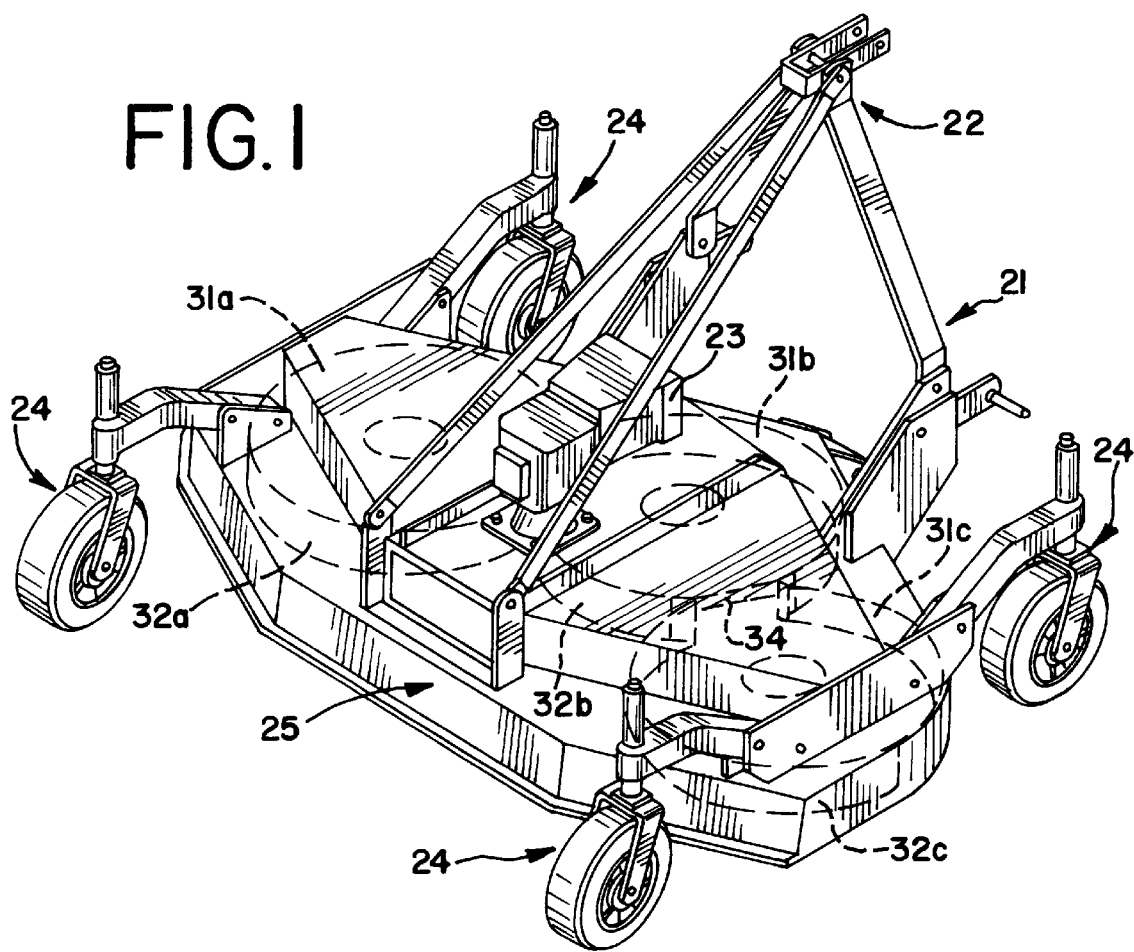
FIG. 1 is a perspective view of a finishing mower exemplifying the type of mower within which the mulching features of the present invention can be incorporated.
Figure 2:
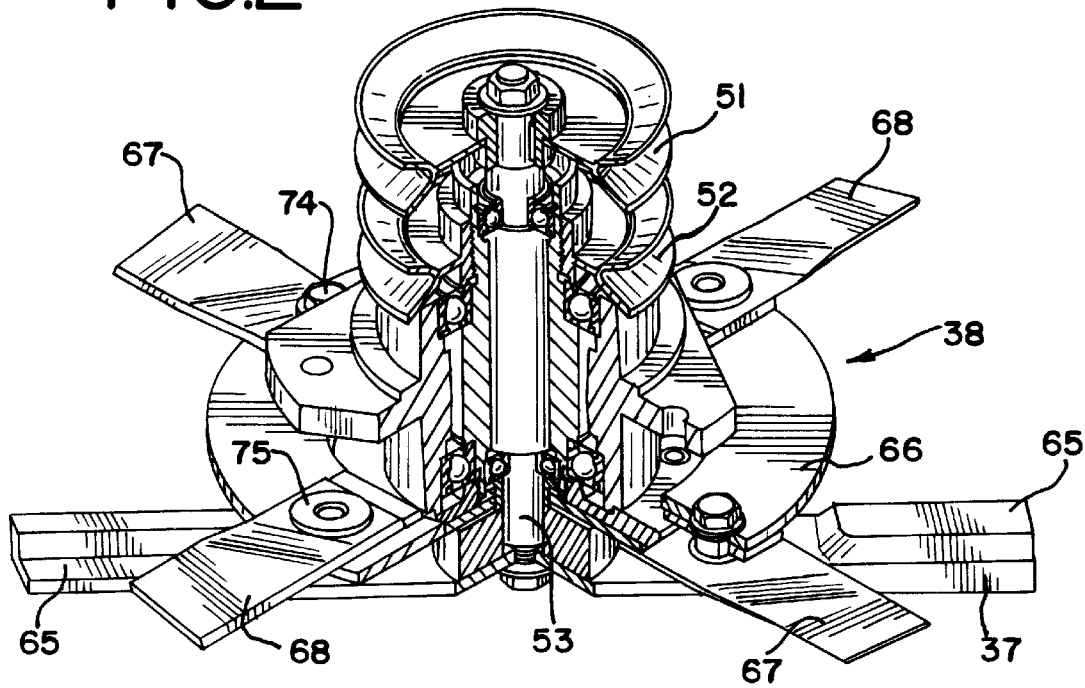
FIG. 2 is a perspective, cut-away view of one of the counterrotation spindle assemblies and drive assembly of the finishing mower shown in FIG. 1.

A finishing mower, generally designated as 21 in FIG. 1, is illustrative of the type of finishing mower within which the present invention can be embodied. It will be understood that various other types of finishing mowers can be improved by incorporating the present invention. These include finishing mowers that are single-decked and pulled by a vehicle such as a tractor and the like and powered by the vehicle through a PTO arrangement, this being the type of finishing mower illustrated in FIG. 1. Multiple-decked arrangements are also suitable for improvement in accordance with the present invention. Typical multiple-deck arrangements in this regard include a plurality of finishing mower units which are tied together by suitable members such as frame components (not shown), with the result that a much wider swath is mowed by such a multi-deck finishing mower assembly than, for example, that shown in FIG. 1.

Another type of finishing mower suitable for improvement in accordance with the present invention is also of the pull-behind type but which is self-powered, these being suitable for use with vehicles that do not have PTO capabilities. Finishing mowers according to the present invention may also be self-propelled and self-powered, such as those which are characterized by having a very short turning radius.

With further reference to the illustrated finishing mower 21, it includes a hitch assembly 22 of a known type, sometimes referred to as a ASAE Category 1 type, in order to achieve advantageous attachment to a pulling vehicle, typically a tractor or the like. A PTO drive shaft (not shown) links the PTO unit of the pulling vehicle to the gearbox 23. It will be appreciated that, in other types of mowers, the gearbox could be substituted with some other power supply, such as an internal combustion engine or a hydraulic motor in those instances where the finishing mower is self-powered. Travel through the grassy areas to be mowed and mulched is facilitated by wheel assemblies 24 which, in the illustrated embodiment, are height-adjustable. The illustrated deck assembly 25 houses three cutting spindle assemblies.

Figure 7:
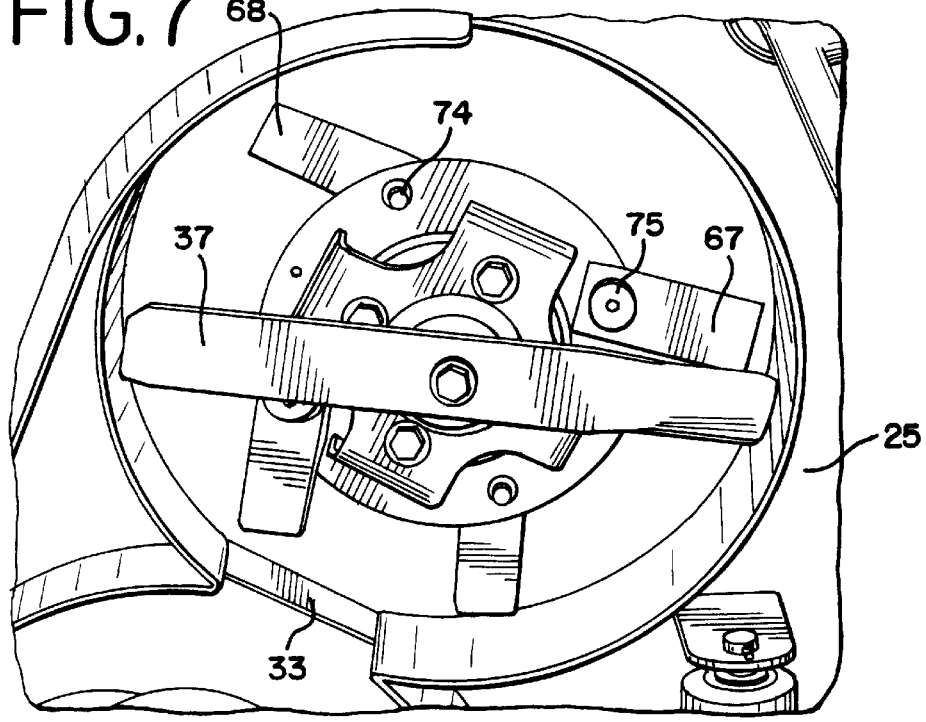
FIG. 7 is a perspective view of a portion of the underside of a mower as shown in FIG. 1.

In the preferred arrangement which is illustrated, each cutting spindle assembly is positioned within baffles that provide a generally circular defined area designed to facilitate mulching carried out in accordance with the present invention. With more particular reference to the illustrated baffle arrangement, each cutting swath location includes a front baffle component 31a, 31b and 31c, as well as a rear baffle component, 32a, 32b and 32c. Center baffle plates 33, 34 are positioned between front and rear baffle components. It is preferred that the center plates 33, 34 have a relatively short height, as can be seen in FIGS. 1 and 7. This permits some distribution of cuttings and air between adjoining swath paths while still encouraging retention of cuttings within individual swath path enclosures. In order to facilitate ingress of vegetation into each swath path enclosure, the front baffles can be slightly shorter than the rear baffles.

Figure 6:
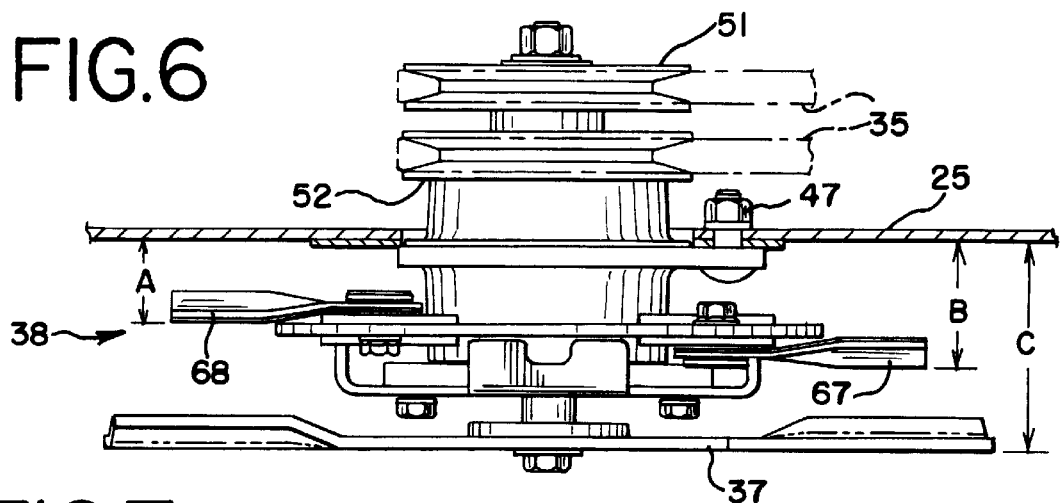
FIG. 6 is a somewhat schematic elevational view of a belt-driven spindle assembly.

In the illustrated embodiment, a driving belt assembly, generally shown in phantom and designated as 35 in FIG. 6, transmits rotational power from the power supply, such as the illustrated gearbox 23. By operation of the driving belt assembly 35, the rotational power is transformed from rotation in a single direction to rotation in both the clockwise direction and the counterclockwise direction, which rotational direction is separately imparted to each cutting spindle assembly. As a result, one of the cutting components on each spindle assembly rotates in a clockwise direction, while the other cutting component rotates in the counterclockwise direction.

Figure 8:
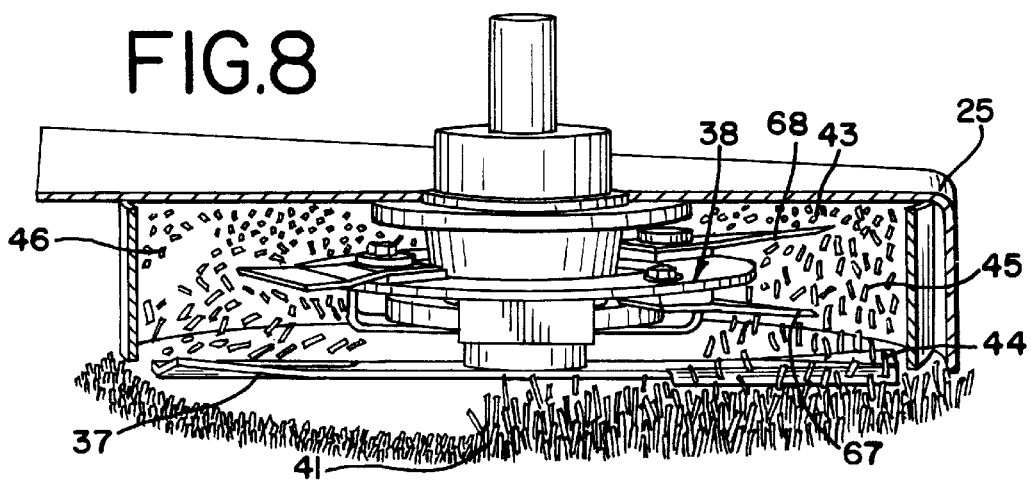
FIG. 8 is a somewhat schematic cut-away perspective view of spindle assembly in accordance with the present invention for effecting cutting and mulching action characteristic of the invention.

More particularly, each cutting spindle assembly includes a lower cutting or mowing blade 37 and an upper mulching tool 38, generally designated as which rotate in opposite rotational directions. As generally illustrated in FIG. 8, the finishing mower 21 passes through a stand of vegetation such as illustrated grass blades 41 growing from the ground. As the blades pass under front baffle component 31c, they are first encountered by the lower cutting blade 37. Resulting cut grass blades 44 are thrown generally upwardly, to and into the upper mulching tool 38. At this location, the cut grass blades are generally reversed in direction to enhance mulching action. The cut grass blades are then further cut into grass blade slivers 45. It will be noted that this mulching action is facilitated by free space between the different levels of the mulching blades. Further mulching activity by the tool 38 forms even smaller grass particles 43, which may be referred to as having been pulverized. Mulched grass clippings 46 are thereby formed and deposited into the thus cut turf. This action is enhanced by free space above the uppermost blade(s) of the mulching tool 38.

FIG. 3 illustrates a preferred spindle assembly in accordance with the present invention when incorporating a belt drive. The driving belt assembly (not shown in FIG. 3) drivingly engages an upper sheave 51 in one direction and a lower sheave 52 in the opposite rotational direction. Upper sheave 51 is secured to and drives driven output shaft or inner shaft 53, and lower driven sheave 52 is secured to and drives output tube or outer barrel 54. It will be noted that driven output shaft 53 passes through driven output tube 54, their relative rotation being facilitated by upper bearing assembly 55 and lower bearing assembly 56. It will further be noted that output tube 54 is rotatably mounted within spindle housing 57 by upper bearing assembly 58 and lower bearing assembly 59. The spindle housing 57 is suitable mounted to the deck assembly 25, such as by illustrated bolt assembly 47 (FIG. 6).

Upper mulching tool 38 is releasably secured to the driven output tube 54, while the lower blade assembly 37 is releasably secured to the driven output shaft 53. Due to the action of the driving assembly, the upper driven sheave 51 and the lower driven sheave 52 will rotate in opposite directions along the same axis. This rotational movement is in turn transmitted to the mulching tool 38 and the blade 37, respectively, through the driven output shaft 53 and the driven output tube 54, respectively. The result is coaxial counterrotation of the upper mulching tool and the lower blade assembly with respect to each other in the same spindle assembly.

Driven output shaft 53 is mounted within and between the two bearing assemblies 55 and 56. Similarly, the driven output tube 54 is mounted within and between the two bearing assemblies 58 and 59. Preferably, these bearing assemblies are sealed bearings which require no additional lubrication for the life of the bearings.

Concerning mounting of the lower cutting blade 37, same can be accomplished by bolt assembly 61 including a spacer washer 62 which can include a countersink bore (not shown) in order to provide solid mounting of the lower cutting blade which will withstand sudden impacts, such as when the lower cutting blade 37 encounters a pipe, rock or the like. Mounting of the upper mulching tool 38 includes bolts 63 and a mounting plate 64. Lower cutting blade 37 preferably includes an uplift section 65 at the tip portions of the blade. This facilitates throwing of the cut grass blades upwardly into the upper mulching tool 38. With more particular reference to the illustrated upper mulching tool, this incorporates a disc weldment which carries a plurality of blades. The preferred embodiment which is illustrated in several of the drawings, namely FIGS. 2, 3, 4, 5, 6, 7 and 8 incorporates a disc 66 which pivotally mounts a plurality of blades. At least one lower blade 67 and at least one upper blade 68 are pivotally mounted to the disc 66. The respective lower and upper blades are vertically spaced from one another by a predetermined distance. For minimum wear, it is preferred that a plurality of blades are mounted at each level and that they be evenly spaced apart so as to avoid uneven loads during rotation of the mulching tool assembly.

In accordance with the invention, each lower blade cuts in one cutting plane, and each upper blade cuts in another cutting plane which is above the one cutting plane. In addition, each upper blade is vertically spaced below the inside surface of the mower deck. Without this multi-level blade planes arrangement, it has been observed that cut foliage material has a tendency to build up under the deck until it reaches the mulching blade of such a single-level mulching blade which counterrotates above a lower cutting blade. Cut foliage material build-up can be especially evident under wet crop conditions. With such a single-level mulching blade which is not in accordance with the present invention, the mulching action of the mulching blade is seriously impaired (if not completely nullified) because there is no longer any free space above the surface of the mulching blade. It has been determined that adequate free space above a mulching blade is required in order for the mulching action to occur.

In addition, cut foliage build-up can proceed to such an extent that the built-up crop actually wedges between the mulching blade and the deck. This can result in the exertion of stopping forces on the mulching blade, this being more problematic when cutting under wet crop conditions. When this force caused by having the rotating blade encounter the build-up is substantial, the blade can actually lock and stop rotation of the spindle. If the operator continues to attempt to mow, serious damage can be imparted to the mower, particularly the driving components. In the illustrated belt system, the driving belt or belts can be damaged under these circumstances and require replacement.

Concerning the multi-level mulching blade arrangement of the present invention, material can build up under the deck only until it reaches the upper blade or blades 68. The lower blade or blades 67 will thus always be provided with space thereabove in order to carry on mulching action by at least each lower blade 67. Of course, if there is no substantial build-up above each upper blade 68, each such upper blade will also carry out mulching action as generally shown in FIG. 8 and as described elsewhere herein. It will be appreciated that the mulching tool 38 could include a third cutting plane if desired and if economically justified.

It has been determined that the multi-level mulching blade structure in accordance with the invention brings forth improved mulching performance in ideal conditions by mulching the cut foliage material to a slightly finer condition to thereby form mulched grass clippings 46 (FIG. 8).

Furthermore, in the illustrated preferred arrangement, one or each of the blades are pivotally mounted to the disk 66. This provides a free-swinging blade arrangement to thereby effectively prevent wedging of cut material between the deck and each upper blade 67. The swinging action of each upper blade as illustrated allows built-up cut material to pass through the blade assembly. This is especially useful under wet crop conditions. In dry crop conditions, a pivotable blade mount is useful in the event that obstacles are encountered or large foliage, such as a protruding root, enters into the mower deck and is thrown up into the mulching tool. Once a blade has been swung away by an obstacle or unusually large piece of foliage, it will promptly swing back into place and commence its mulching action.

A typical clearance or spacing "A" (FIG. 6) between the mower deck and the lower surface of upper mulching blade 68 is at least about one inch (about 2.5 cm), typically at least about 1.5 inch (about 3.8 cm). It is also important that adequate free space be provided between the upper mulching plane and the lower mulching plane. In this regard, the spacing "B" between the under surface of the mower deck and the lower edge of the lower blade 67 is typically at least about 2 inches (about 5 cm), typically at least about 2.5 inches (about 6.3 cm). Accordingly, the typical spacing between the respective mulching planes is generally about one inch (about 2.5 cm). This spacing between the mulching planes can be slightly less or greater, depending somewhat upon the particular blade configuration and assembly requirements. Typically, the lower cutting blade will be spaced by a distance "C" from the under surface of the mower deck, typically such distance being at least about 4 inches (about 10.2 cm). The desire here is to provide adequate spacing between the upper profile of the lower cutting blade and the lower mulching plane to facilitate the mulching action of the counterrotating blades flanking this space.

The specific mounting structure for the blades which is illustrated in the drawings includes a disc carrier 71 to which the disc 66 is suitably mounted such as by the bolts 63. A blade bushing 72 is also preferably provided as shown in FIG. 3. A plate 73 (FIG. 5) is provided for mounting purposes. With this arrangement, the disc 66 and thus each blade mounted thereonto is secured to the driven output tube 54 to thereby rotate in a radial direction which is the opposite of the rotational direction of the lower cutting or mowing blade 37.

With reference to the illustrated pivotable mounting of the blades 67, 68, a capscrew 74 defines the pivot axis for both lower blade 67 and upper blade 68. A blade nut 75 secures each capscrew in place. A pad 76 (FIGS. 4 and 5) assists in facilitating the pivotable mounting of each blade 67, 68.

It will be understood that the embodiments of the present invention which have been described are illustrative of some of the applications of the principles of the present invention. Various modifications may be made by those skilled in the art without departing from the true spirit and scope of the invention.

We claim:

1. A mulching finishing mower with dual counterrotating cutting assemblies for cutting and mulching turf vegetation, the mower comprising:

a deck assembly associated with at least one ground engagement member and an assembly for transporting the mower across a field of vegetation to be cut and mulched;

a lower mowing blade rotatably mounted along said deck assembly so as to engage and cut vegetation over which said mower moves and which passes generally under said deck assembly;

an upper mulching tool rotatably mounted along said deck assembly so as to engage and mulch vegetation over which said mower moves and into which vegetation is propelled thereinto by said lower mowing blade, said upper mulching tool being above said lower mowing blade;

a drive assembly associated with said deck assembly, said drive assembly simultaneously driving both said lower mowing blade and said upper mulching tool;

said drive assembly including a rotatably mounted driven output shaft in driving engagement with said lower mowing blade and a rotatably mounted driven output tube in driving engagement with said mulching tool, said output shaft passing through said output tube, and said lower mowing blade and upper mulching tool being driven respectively by said output shaft and output tube in counterrotation with respect to each other;

said upper mulching tool including a plurality of blades, at least one of said blades being in a lower mulching plane, at least one other of said blades being in an upper mulching plane, said upper mulching plane being vertically spaced above said lower mulching plane by a predetermined distance, and said lower mulching plane being vertically spaced above said lower mowing blade by another predetermined distance;

said lower mowing blade having knife edge means for engaging and cutting turf vegetation over which said mower is transported to provide cut vegetation;

said blade in the lower mulching plane having knife edge means for engaging and further cutting the cut vegetation to provide mulched vegetation slivers; and said blade in the upper mulching plane having knife edge means for engaging and further cutting the mulched vegetation slivers to provide further mulched clippings.

2. The mulching mower in accordance with claim 1, wherein a plurality of said blades are in the lower mulching plane.

3. The mulching mower in accordance with claim 2, wherein a plurality of said blades are in the upper mulching plane.

4. The mulching mower in accordance with claim 1, wherein a plurality of said blades are in the upper mulching plane.

5. The mulching mower in accordance with claim 1, wherein at least one of said blades of the upper mulching tool is pivotally mounted to the upper mulching tool.

6. The mulching mower in accordance with claim 1, wherein said plurality of blades are pivotally mounted to the upper mounting tool.

7. The mulching mower in accordance with claim 1, wherein said upper mulching tool includes a disc member, at least one of said blades being pivotally mounted onto an upper surface of said disc member, and at least one of said blades being pivotally mounted onto a lower surface of said disc mower.

8. The mulching mower in accordance with claim 1, wherein said blades of the upper mulching tool each rotate in one rotational direction, and said lower mowing blade rotates in a counterrotational direction opposite to that of said one rotational direction of the upper mulching tool.

9. The mulching mower in accordance with claim 1, wherein said drive assembly is a belt drive assembly, said belt drive assembly including a driven sheave for the lower blade, which driven sheave is secured to an upper portion of said output shaft; and said belt drive assembly further includes a driven sheave for the upper mulching tool, which driven sheave is secured to an upper portion of said output tube.

10. The mulching mower in accordance with claim 1, wherein said lower mowing blade and said mulching tool are included within a spindle assembly, and said mulching mower has a plurality of said spindle assemblies spaced from each other on said deck assembly.

11. The mulching mower in accordance with claim 10, wherein each spindle assembly is generally within the perimeter of a baffle assembly secured to the deck assembly, each baffle assembly having a center portion joining adjacent said baffle assemblies while providing open space therebetween.

12. The mulching mower in accordance with claim 1, wherein said lower mowing blade throws cut vegetation generally upwardly, to and into the upper mulching tool which generally reverses the direction of flow of the cut vegetation, whereby mulching action of the mulching mower is enhanced.

13. A mulching finishing mower with dual counterrotating cutting assemblies for cutting and mulching turf vegetation, the mower comprising:

a deck assembly associated with at least one ground engagement member and an assembly for transporting the mower across a field of vegetation to be cut and mulched;

a lower mowing blade rotatably mounted along said deck assembly so as to engage and cut vegetation over which said mower moves and which passes generally under said deck assembly;

an upper mulching tool rotatably mounted along said deck assembly so as to engage and mulch vegetation over which said mower moves and into which vegetation is propelled thereinto by said lower mowing blade, said upper mulching tool being above said lower mowing blade;

a drive assembly secured to said deck assembly, said drive assembly simultaneously driving both said lower mowing blade and said upper mulching tool;

said drive assembly including a rotatably mounted driven output shaft in driving engagement with said lower mowing blade and a rotatably mounted driven output tube in driving engagement with said mulching tool, said output shaft passing through said output tube, and said lower mowing blade and upper mulching tool being driven respectively by said output shaft and output tube in counterrotation with respect to each other;

said upper mulching tool including a plurality of blades, at least two of said blades being in a lower mulching plane, at least two others of said blades being in an upper mulching plane, said upper mulching plane being vertically spaced above said lower mulching plane by a predetermined distance of at least about 2 cm, and said lower mulching plane being vertically spaced above said lower mowing blade by another predetermined distance;

said lower mowing blade cutting turf vegetation over which said mower is transported to provide cut vegetation;

said blades in the lower mulching plane further cutting the cut vegetation to provide mulched vegetation slivers; and said blades in the upper mulching plane further cutting the mulched vegetation slivers to provide further mulched clippings.

14. The mulching mower in accordance with claim 13, wherein said plurality of blades are pivotally mounted to the upper mounting tool.

15. The mulching mower in accordance with claim 13, wherein said upper mulching tool includes a disc member, at least two of said blades being pivotally mounted onto an upper surface of said disc member, and at least two of said blades being pivotally mounted onto a lower surface of said disc mower.

16. The mulching mower in accordance with claim 13, wherein said blades of the upper mulching tool each rotate in one rotational direction, and said lower mowing blade rotates in a counterrotational direction opposite to that of said one rotational direction of the upper mulching tool.

17. The mulching mower in accordance with claim 13, wherein said drive assembly is a belt drive assembly, said belt drive assembly including a driven sheave for the lower blade, which driven sheave is secured to an upper portion of said output shaft; and said belt drive assembly further includes a driven sheave for the upper mulching tool, which driven sheave is secured to an upper portion of said output tube.

18. The mulching mower in accordance with claim 13, wherein said lower mowing blade and said mulching tool are included within a spindle assembly, and said mulching mower has a plurality of said spindle assemblies spaced from each other on said deck assembly.

19. The mulching mower in accordance with claim 18, wherein each spindle assembly is generally within the perimeter of a baffle assembly secured to the deck assembly, each baffle assembly having a center portion joining adjacent said baffle assemblies while providing open space therebetween.

20. The mulching mower in accordance with claim 13, wherein said lower mowing blade throws cut vegetation generally upwardly, to and into the upper mulching tool which generally reverses the direction of flow of the cut vegetation, whereby mulching action of the mulching mower is enhanced.

* * * * *